(12) United States Patent
Meiseles

(10) Patent No.: US 7,010,880 B1
(45) Date of Patent: Mar. 14, 2006

(54) SPLIT SHOT ATTACHMENT AND REMOVAL TOOL

(76) Inventor: Steven H. Meiseles, 110 Powder Mill Rd., Morris Plains, NJ (US) 07950-1411

(*) Notice: Subject to any disclaimer, the term of this patent is extended or adjusted under 35 U.S.C. 154(b) by 31 days.

(21) Appl. No.: 10/935,121

(22) Filed: Sep. 8, 2004

(51) Int. Cl.
*A01K 95/02* (2006.01)

(52) U.S. Cl. .................... 43/4; 43/44.89; 7/106

(58) Field of Classification Search ............. 43/4, 43/44.89; 7/106; 30/120.1, 120.2
See application file for complete search history.

(56) References Cited

U.S. PATENT DOCUMENTS

| 838,920 | A | * | 12/1906 | Varnedoe | 7/106 |
|---|---|---|---|---|---|
| 2,571,819 | A | * | 10/1951 | Boel et al. | 7/106 |
| 2,603,992 | A | * | 7/1952 | Brown et al. | 43/4 |
| 2,618,994 | A | * | 11/1952 | Frazee | 72/325 |
| 2,653,332 | A | * | 9/1953 | Precious | 7/106 |
| 2,656,746 | A | * | 10/1953 | Glass, Jr. et al. | 81/367 |
| 2,723,403 | A | * | 11/1955 | Miller | 7/106 |
| 2,736,026 | A | * | 2/1956 | Belokin, Jr. | 43/44.89 |
| 2,753,741 | A | * | 7/1956 | Riley | 7/106 |
| 2,765,686 | A | * | 10/1956 | Deline | 43/44.89 |
| 2,765,687 | A | * | 10/1956 | Stanfield | 43/44.89 |
| 2,790,341 | A | * | 4/1957 | Keep et al. | 43/44.89 |
| 2,806,229 | A | * | 9/1957 | Pletz | 7/132 |
| 2,842,993 | A | * | 7/1958 | Thomas | 43/44.89 |
| 2,844,980 | A | * | 7/1958 | Johnson | 72/416 |
| 2,853,722 | A | * | 9/1958 | Puzine | 7/106 |
| 2,920,514 | A | * | 1/1960 | Bruce et al. | 7/106 |
| 2,961,670 | A | * | 11/1960 | Frame | 7/106 |
| 3,003,376 | A | * | 10/1961 | Macy et al. | 7/106 |
| 3,070,815 | A | * | 1/1963 | Marr | 7/106 |
| 3,094,717 | A | * | 6/1963 | Gabbert | 7/106 |
| 3,153,959 | A | * | 10/1964 | Scoville | 72/71 |
| 3,162,869 | A | * | 12/1964 | Friedell | 7/106 |
| 3,172,319 | A | * | 3/1965 | Stanfied | 7/106 |
| 3,330,025 | A | * | 7/1967 | Williams | 7/106 |
| 3,371,400 | A | * | 3/1968 | Edes | 29/817 |
| 3,447,173 | A | * | 6/1969 | Kleiman | 7/106 |
| 3,581,424 | A | * | 6/1971 | Bloom | 43/4 |
| 3,597,775 | A | * | 8/1971 | McCasland | 7/106 |
| 3,641,654 | A | * | 2/1972 | Wheeler | 29/34 R |
| 3,825,961 | A | * | 7/1974 | Klein | 7/106 |
| 3,914,976 | A | * | 10/1975 | Karr | 72/339 |
| 4,029,346 | A | * | 6/1977 | Browning | 289/17 |
| 4,050,176 | A | * | 9/1977 | Asper | 24/561 |
| 4,057,863 | A | * | 11/1977 | Bewley | 7/106 |

(Continued)

FOREIGN PATENT DOCUMENTS

EP      432554 A1 *  6/1991

(Continued)

*Primary Examiner*—Darren W. Ark
(74) *Attorney, Agent, or Firm*—Thomas J. Germinario

(57) ABSTRACT

A fishing tool designed to attach and remove split shot to/from fishing line is disclosed. The tool comprises a top member, which is a flexible bowed strip of spring metal, pivotally connected to a base member, which is a rigid strip of sheet metal. Split shot is attached by threading line through the split and securing the shot in a splayed groove in the base member. Manual pressure applied to the plier end of the top member bends it down so as to compress the shot, causing it to close around the line. Split shot is removed from a line by placing the attached shot in a concave depression in the base member and exerting downward pressure on the prying end of the top member. A wedge-shaped prying tool in the prying end penetrates the split in the shot and pries it open, releasing the line.

4 Claims, 1 Drawing Sheet

U.S. PATENT DOCUMENTS

| | | | | |
|---|---|---|---|---|
| 4,136,548 A | * | 1/1979 | Dippold | 7/106 |
| 4,144,605 A | * | 3/1979 | Eberhardt | 7/106 |
| 4,208,749 A | * | 6/1980 | Hermann et al. | 7/106 |
| 4,377,027 A | * | 3/1983 | Price | 43/44.89 |
| 4,484,368 A | * | 11/1984 | Thompson | 7/106 |
| 4,631,855 A | * | 12/1986 | Ader | 7/106 |
| 4,651,462 A | * | 3/1987 | Nakagawa | 7/106 |
| 4,796,318 A | * | 1/1989 | Bigej | 7/106 |
| 4,899,482 A | * | 2/1990 | Gerdes | 43/4 |
| 5,136,744 A | * | 8/1992 | Allsop et al. | 43/4 |
| D332,651 S | * | 1/1993 | Sugerman | D22/149 |
| 5,207,012 A | * | 5/1993 | Lael | 43/4 |
| 5,207,014 A | * | 5/1993 | Panella | 43/4 |
| 5,425,193 A | * | 6/1995 | Gelb | 43/4 |
| 5,475,941 A | * | 12/1995 | Moore | 43/4 |
| 5,491,856 A | * | 2/1996 | Legg | 7/106 |
| 5,557,874 A | * | 9/1996 | Pietrandrea et al. | 43/4 |
| 5,850,649 A | * | 12/1998 | Simpson | 7/106 |
| 5,930,888 A | * | 8/1999 | Ball et al. | 29/817 |
| 5,960,504 A | * | 10/1999 | Dougherty | 43/4 |
| 6,477,803 B1 | * | 11/2002 | Casagram | 43/43.12 |
| 2002/0017048 A1 | * | 2/2002 | Lam | 43/4 |
| 2005/0150150 A1 | * | 7/2005 | Yabusaki | 43/4 |

FOREIGN PATENT DOCUMENTS

| | | | | |
|---|---|---|---|---|
| EP | 1198987 A1 | * | 4/2002 |
| FR | 2547983 A1 | * | 1/1985 |
| FR | 2617375 A1 | * | 1/1989 |
| GB | 2183197 A | * | 6/1987 |
| GB | 2322780 A | * | 9/1998 |
| GB | 2377151 A | * | 1/2003 |
| GB | 2394157 A | * | 4/2004 |
| JP | 6-284843 A | * | 10/1994 |
| JP | 8-80146 A | * | 3/1996 |
| JP | 2000-342143 A | * | 12/2000 |
| JP | 2002-150 A | * | 1/2002 |
| JP | 2003-189774 A | * | 7/2003 |
| JP | 2004-329054 A | * | 11/2004 |

* cited by examiner

SPLIT SHOT ATTACHMENT AND REMOVAL TOOL

BACKGROUND OF THE INVENTION

In fishing, particularly in freshwater fly fishing, a fisherman needs to attach split shot, usually composed of lead or tin, to the fishing line to add weight so that the line and attached fly will submerge. A typical split shot is spherical in shape with a central split dividing it into two hemispheres. The shot is attached to a fishing line by inserting the line into the split and crimping the split closed around the line. As water conditions, depth and current speed change, the fisherman must add or remove split shot, which is available in various sizes, in order to adjust the weight of the line to achieve the correct depth of float. When adding split shot to a line, a fisherman will often crimp the shot closed with his teeth. Alternately, a fisherman may crimp the shot by squeezing it between his fingers or using pliers.

Using one's teeth as a crimping tool entails risks of dental injury and toxic hazards associated with ingestion of heavy metals, particularly lead. Squeezing the split shot between one's fingers often does not result in a tight closure due to the softness of the fingers and the discomfort associated with applying digital pressure to a hard protruding surface. Since a fisherman will typically attach the split shot with one hand while he holds his fishing rod in the other, conventional pliers are problematic, since they require the use of both hands—one to hold the shot and the other to operate the pliers.

When water conditions require the fisherman to reduce the weight on the fishing line, some of the split shot must be removed. This operation requires that the split in the shot be pried open again or that the shot be cut through the middle to release it from the line. Again, a fisherman will often use his teeth to pry open the split shot, with the same attendant risks associated with closing the shot in this manner. Use of the fingernails to pry the shot open if frequently ineffective and also involves risk of broken fingernails as well as discomfort. The use of a knife or other sharp tool to pry open split shot or cut it—like the use of pliers for closing the shot—requires the use of two hands. Moreover, in the slippery wet environment of fishing, there is a heightened risk of injury associated with the use of knives.

Consequently, there is a need for a fishing tool capable of effectively attaching and detaching split shot to/from a fishing line. Optimally such a tool would be compact, accessible, easy to use and operable with one hand, and its use in the fishing environment would not involve significant risks of injury to the fisherman. Much of the prior art in this area involves some variation of a plier-type design. This category takes in most of the older art, such as McKeehan, U.S. Pat. No. 2,920,514 (January 1960), Stanfield, U.S. Pat. No. 3,172,319 (March 1965), Hermann, U.S. Pat. No. 4,208,749 (June 1980), Bigej, U.S. Pat. No. 4,796,318 (January 1989), as well as some of the more recent patents, such as Lael, U.S. Pat. No. 5,207,012 (May 1993), and Simpson, U.S. Pat. No. 5,850,649 (December 1998). A slight variation on this same design involves a modified hemostat tool, as disclosed by Pietrandrea, U.S. Pat. No. 5,557,874 (September 1996). All of these tools, however, share the disadvantage of requiring the use of both hands in order to be operated safely and effectively.

The second major category of the prior art in this field consists of combination sinker attachment/dispenser tools, such as Belokin, U.S. Pat. No. 2,736,026 (February 1956), Stanfield, U.S. Pat. No. 2,765,687 (October 1956), Thomas, U.S. Pat. No. 2,842,993 (July 1955), Johnson, U.S. Pat. No. 2,844,980 (April 1956), Edes, U.S. Pat. No. 3,371,400 (March 1968), Dippold, U.S. Pat. No. 4,136,548 (January 1979), Price, U.S. Pat. No. 4,377,027 (March 1983), and Ball, U.S. Pat. No. 5,930,888 (August 1999). With the exception of Dippold and Ball, however, these tools are not capable of reopening the split shot, and none of them is readily operable with one hand. Moreover, the mechanical complexity of these tools compromises their compactness, ease of use and reliability in the field.

While one reference, Casagram, U.S. Pat. No. 6,477,803 B1 (November 2002), does disclose a simple, compact tool for opening split shot, this reference still does not satisfy the identified need because it lacks the function of also closing the split shot, and its operation requires both hands.

For the foregoing reasons, there remains a need, not satisfactorily addressed by the prior art, for a split shot fishing tool which effectively, safely and reliably performs both split shot attachment and removal, yet is also compact, easy to use, and operable with one hand. Since fisherman, particularly fly fishermen, need to be able to access their tools quickly, there is also a great advantage to a tool which is attachable to the fisherman's vest or "zinger" and thus can be readily deployed without going to the tackle box or reaching into a pocket.

SUMMARY OF THE INVENTION

The present invention is directed to a tool that safely, effectively and reliably performs the attachment and removal of split shot to/from fishing line and is also compact, accessible, easy to use, and operable with one hand. The use of flexible spring metal in the moving parts of the tool enables an economical and simple design—similar to that of a nail clipper—which is well suited to single-handed operation. The light weight compactness of the tool allows it to be accessed, handled and stored more easily than the more mechanically complicated and cumbersome fishing tools, such as pliers. The economical compact design also makes this tool ideal for attaching to a fisherman's vest or "zinger", so that it is always available at his fingertips.

A split shot attachment and removal tool having features of the present invention accommodates the two principle functions of split shot attachment and removal in a single integrated design. The mechanisms for performing these two principle functions are positioned on the opposite ends of the long, slender tool, which comprises a top member and a base member. The top member is a thin, flexible strip of spring metal having a concave shape with its ends bowed upward with respect to the base member. One side of the top member is a prying end and the other side is a plier end. The base member is a rigid strip of sheet metal having a shot-opening end and a shot-closing end. The top and base members are pivotally connected by a center joint at their mid-sections, such that the prying end of the top member can be flexed downward to contact the shot-opening end of the base member, while the plier end of the top member may be flexed downward to contact the shot-closing end of the base member.

The prying end of the top member has a prying tool, which is wedge-shaped with its edge extending downward toward the base member. Manual pressure exerted downward on the prying end causes it to bend such that the prying tool comes into contact with the shot-opening end of the base member. Where the prying tool makes contact with the base member, there is a concave depression in the shot-opening end, which depression is sized to hold split shot of various sizes.

The undersurface of the plier end to the top member serves as a plier tool. Manual pressure exerted downward on the plier end causes it to bend such that the plier tool comes into contact with the shot-closing end of the base member. Where the plier tool makes contact with the base member, there is a splayed groove in the shot-closing end, which groove widens toward the end of the base member and is sized to secure in place split shot of various diameters.

Split shot is attached to a fishing line by threading the line through the split and inserting the split shot into the wide end of the groove so that it becomes wedged in the groove as it tapers down. With the split shot thus secured in the base member, manual pressure is applied downward on the plier end of the top member, causing the spring metal to flex downward. The split shot is compressed between the descending plier tool and the splayed groove, which causes the split in the shot to close around the fishing line, thus securing the split shot to the line.

Split shot is removed from a fishing line by placing the split shot with the split facing upward in the concave depression in the shot-opening end of the base member. With the split shot thus positioned, manual pressure is applied downward on the prying end of the top member, causing the spring metal to flex downward. The descending wedge-shaped prying tool penetrates the split in the shot and pries it open, thereby releasing its grip on the fishing line.

In the preferred embodiment, a means of attaching the tool to a fisherman's vest or "zinger" is provided in one end of the base member, thus taking advantage of the compact design of the tool to make it readily accessible at all times to the fisherman. The attachment means can consist of a hole drilled in a short extension of the base member beyond the concave depression in the shot-opening end.

In one alternate embodiment, the plier end of the top member and the shot-closing end of the base member are tapered so as to form a pair of needle-nosed pliers for removing a hook from a fish's mouth. In another alternate embodiment, one side of the edge of the prying tool is sharpened so that it can cut through a split shot which cannot be pried open.

DESCRIPTION OF THE INVENTION

Figure 1:
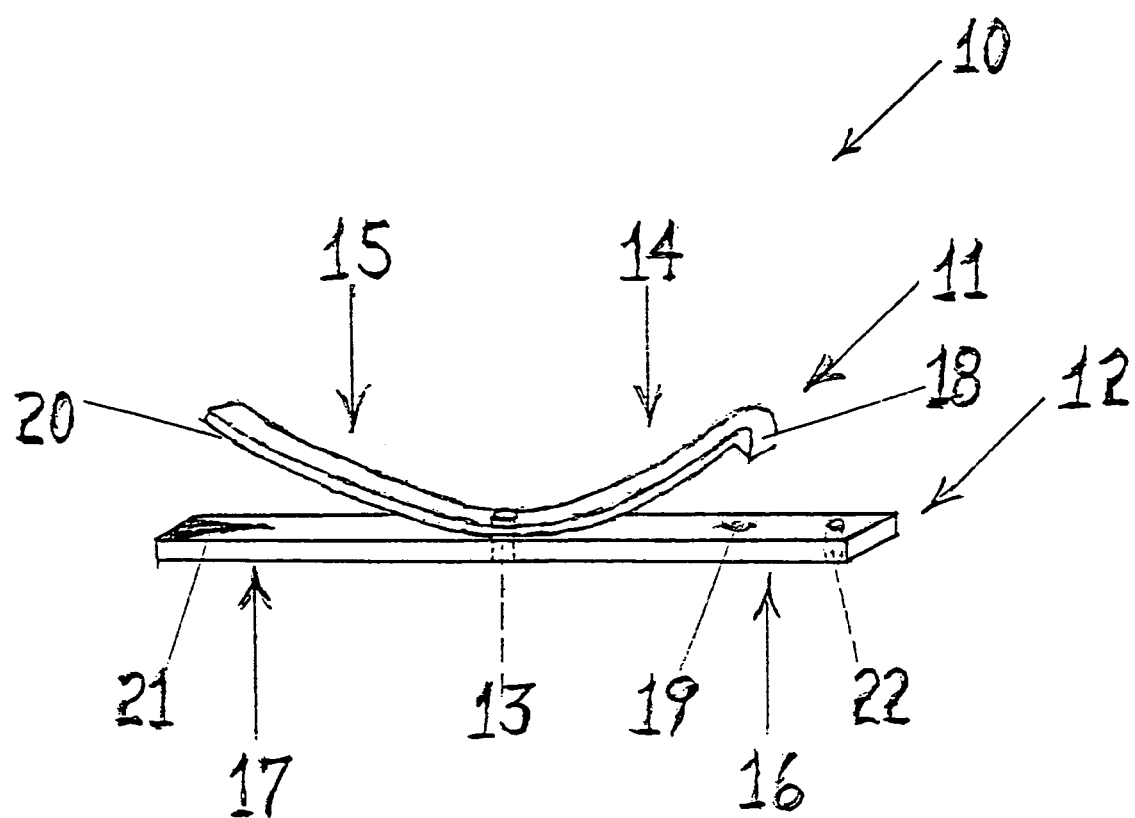
FIG. 1 is a perspective view of a split shot attachment and removal device embodying features of the present invention.

As shown in FIG. 1, a split shot attachment and removal tool having the features of the present invention 10 comprises a top member 11 and a base member 12, which are connected at their respective midsections by a center joint 13. The top member 11 comprises a thin, flexible strip of spring metal with a concave shape, the ends of which bow upward in relation to the base member 12. The base member 12 comprises a rigid strip of sheet metal. The top member 11 has a prying end 14 and a plier end 15, while the base member 12 has a shot-opening end 16 and a shot-closing end 17. The center joint 13 pivotally connects the top member 11 and the base member 12 such that the prying end 14 can be flexed downward to contact the shot-opening end 16, while the plier end 15 can be flexed downward to contact the shot-closing end 17.

The prying end 14 has a wedge-shaped appendage which forms a prying tool 18. The edge of the prying tool 18 extends downward toward the base member 12, such that when manual pressure is exerted downward on the prying end 14, it bends, bringing the prying tool 18 into contact with the shot-opening end 16. In the area of the shot-opening end where the prying tool 18 makes contact is located a concave depression 19 sized to hold split shot of various diameters. Split shot (not shown) is removed from a fishing line (not shown) by placing the split shot with the split facing upward into the concave depression 19 in the shot-opening end 16. With the split shot thus positioned, manual pressure is applied downward on the prying end 14, causing the spring metal to flex downward. The descending wedge-shaped prying tool 18 penetrates the split in the shot and pries it open, thereby releasing its grip on the fishing line.

The plier end 15 has a plier tool 20 comprising the undersurface of the plier end 15, such that when manual pressure is exerted downward on the plier end 15, it bends, bringing the plier tool 20 into contact with the shot-closing end 17. In the area where the plier tool 20 makes contact with the shot-closing end 17 is located a splayed groove 21, which widens toward the end of the base member 12 and is sized to secure in place split shot of various diameters. Split shot (not shown) is attached to a fishing line (not shown) by threading the line through the split and inserting the split shot into the wide end of the splayed groove 21 so that it becomes wedged in the groove 21 as it tapers down. With the split shot thus secured in the base member 12, manual pressure is applied downward on the plier end 15, causing the spring metal to flex downward. The split shot is compressed between the descending plier tool 20 and the splayed groove 21, which causes the split in the shot to close around the fishing line, thus securing the split shot to the line.

In the preferred embodiment, a means of attaching the tool to a fisherman's vest (not shown) or "zinger" (not shown) is provided in one end of the base member 12, thus taking advantage of the compact design of the tool to make it readily accessible at all times to the fisherman. The attachment means 22 can consist of a hole drilled in a short extension of the base member 12 beyond the concave depression 19 in the shot-opening end 16.

In one alternate embodiment, the plier end 15 and the shot-closing end 17 are tapered so as to form a pair of needle-nosed pliers for removing a hook (not shown) from a fish's mouth. In another alternate embodiment, one side of the edge of the prying tool 18 is sharpened so that it can cut through a split shot (not shown) which cannot be pried open.

The present invention is, therefore, well adapted to satisfy the need for a fishing tool which effectively, safely and reliably performs both split shot attachment and removal, yet is also compact, readily accessible, easy to use, and operable with one hand.

While the present invention has been described is some detail with reference to certain currently preferred embodiments, other embodiments are feasible and will readily suggest themselves to those skilled in the art. Therefore, the spirit and scope of the appended claims are not limited to the description of the preferred embodiment contained herein.

What is claimed is:

1. A fishing tool comprising:
   (a) a top member comprising a thin, flexible strip of spring metal that is concave in shape and has a prying end and a plier end;
   (b) a base member comprising a rigid strip of sheet metal having a shot-opening end and a shot-closing end;

(c) a center joint pivotally connecting the top member and the base member at their respective mid-sections, such that respective longitudinal axes of the top member and the base member cannot cross one another, and such that the prying end of the top member can be flexed downward to contact the shot-opening end of the base member, while the plier end of the top member can be flexed downward to contact the shot-closing end of the base member;

(d) a prying tool comprising a wedge-shaped appendage at the prying end, an edge of the wedge-shaped appendage extends downward toward the base member, such that manual pressure exerted downward on the prying end causes it to bend, bringing the prying tool into contact with the shot-opening end of the base member;

(e) a concave depression positioned on the base member where the prying tool makes contact with the base member and sized to hold split shot of various diameters, such that when a split shot attached to a fishing line is placed in the concave depression and manual pressure is exerted downward on the prying end, the descending prying tool penetrates a split in the split shot and pries it open, thereby releasing the fishing line;

(f) a plier tool comprising an undersurface of the plier end of the top member, such than manual pressure exerted downward on the plier end causes it to bend, bringing the plier tool into contact with the shot-closing end of the base member;

(g) a splayed groove positioned on the base member, on an opposite side of the center joint from the concave depression, where the plier tool makes contact with the base member and widening toward the shot-closing end of the base member, the splayed groove is sized to secure in place split shot of various diameters, such that when a split shot threaded with fishing line is secured in the splayed groove and manual pressure is exerted downward on the plier end, the split shot is compressed between the descending plier tool and the splayed groove, which causes a split in the shot to close around the fishing line, thus securing the split shot to the line.

2. The fishing tool according to claim 1, further comprising a means for attaching the fishing tool to a fisherman's "zinger", clothing or equipment.

3. The fishing tool according to either claim 1 or 2, wherein the plier end of the top member and the shot-closing end are tapered so as to form a pair of needle-nosed pliers for gripping a fishing hook to remove it from a fish's mouth.

4. The fishing tool according to any of claims 1–3, wherein the wedge-shaped appendage edge is sharpened on one side thereof, such that it can cut through a split shot which cannot be pried open.

* * * * *